United States Patent [19]

Levine et al.

[11] 4,255,495

[45] Mar. 10, 1981

[54] CORROSION RESISTANT THERMAL BARRIER COATING

[75] Inventors: Stanley R. Levine, Rocky River; Robert A. Miller, Strongsville; Philip E. Hodge, Oakwood Village, all of Ohio

[73] Assignee: The United States of America as represented by the Administrator of the National Aeronautics and Space Administration, Washington, D.C.

[21] Appl. No.: 89,779

[22] Filed: Oct. 31, 1979

[51] Int. Cl.³ ............................................. B32B 15/04
[52] U.S. Cl. .................................. 428/632; 428/471; 428/678; 428/679; 428/680
[58] Field of Search .............................. 428/630–633, 428/678–685, 433, 450, 471; 427/39, 376.2; 106/58, 63, 69

[56] References Cited

U.S. PATENT DOCUMENTS

| | | | |
|---|---|---|---|
| 3,006,782 | 10/1961 | Wheildon, Jr. | 428/632 |
| 4,095,003 | 6/1978 | Weatherly et al. | 428/632 |

OTHER PUBLICATIONS

Hurlbut, Jr., *Dana's Manual of Mineralogy*, 15th edition, John Wiley & Sons, Inc., New York, pp. 326, 471, 479.
Sims, C. T. et al., *The Superalloys;* J. Wiley & Sons, New York, p. 347.

*Primary Examiner*—Michael L. Lewis
*Attorney, Agent, or Firm*—N. T. Musial; J. R. Manning; G. E. Shook

[57] ABSTRACT

The object of the invention is to provide a thermal barrier coating system for protecting metal surfaces at high temperature in normally corrosive environments.

The thermal barrier coating system includes a metal alloy bond coating, the alloy containing nickel, cobalt, iron, or a combination of these metals. The system further includes a corrosion resistant thermal barrier oxide coating containing at least one alkaline earth silicate.

The preferred oxides are calcium silicate, barium silicate, magnesium silicate, or combinations of these silicates.

12 Claims, No Drawings

CORROSION RESISTANT THERMAL BARRIER COATING

ORIGIN OF THE INVENTION

The invention described herein was made by employees of the United States Government and may be manufactured and used by or for the Government for governmental purposes without the payment of any royalties thereon or therefor.

TECHNICAL FIELD

The invention relates to a thermal barrier coating system for metal surfaces that are subject to high temperature use in a normally corrosive environment. The invention is particularly directed to protecting the surfaces of metal components, gas turbines, and other heat engine parts that are exposed to fuels contaminated with metallic impurities which are normally corrosive to previously known metallic coatings.

Thermal barrier coatings for gas turbine service must be capable of withstanding exposure in contaminated hot corrosion or sulfidation causing fuels for at least 1000 hours and preferably much longer. Current zirconia-based thermal barrier coatings as well as coatings based on oxides with similar physical and chemical properties, such as ceria, hafnia, and thoria, do not have the requisite durability.

BACKGROUND ART

U.S. Pat. No. 4,055,705 to Stecura and Liebert discloses a thermal barrier coating system wherein a stabilized zirconia thermal barrier coating covers a NiCrAlY bond coating. Certain problems have been encountered when this system is used in an environment of contaminated fuels.

Tucker, Jr. U.S. Pat. No. 3,837,894 and Weatherly et al U.S. Pat. No. 4,095,003 disclose duplex coatings. Both patents are concerned with the porosity of prior art coatings. In the Tucker, Jr. patent the undercoat is metallurgically sealed by heat treating. Weatherly et al refers to the Tucker patent and points out that not all substrates can be heat treated without degrading the properties of the substrate. The Weatherly et al patent utilizes a bond coating that is formed in two layers and then heat treats prior to the application of the ceramic layer. Takabatake et al U.S. Pat. No. 3,927,223 is directed to refractory based oxide coated membrane on a substrate.

While satisfactory results for a limited time have been achieved with the coatings of the prior art, none are capable of withstanding the exposure of contaminated fuels for the time required for gas turbines and other heat engines.

DISCLOSURE OF INVENTION

A corrosion resistant thermal barrier coating system produced in accordance with the present invention has an outer layer of oxide 5 to 50 mils thick deposited on a bond coat. The thermal barrier oxide is one or a combination of alkaline earth silicates.

The preferred oxides are calcium silicate in the range $1CaO:1SiO_2$ to $3CaO:1SiO_2$, barium silicate in the range $1BaO:1SiO_2$ to $3BaO:1SiO_2$, magnesium silicate in the range $1MgO:SiO_2$ to $3MgO:1SiO_2$, or combinations of these silicates. These oxides may also be used with additions of up to 50% by weight of excess free silica.

BEST MODE FOR CARRYING OUT THE INVENTION

Cast hollow erosion test bars of nickel-base alloy IN-792 and cobalt-base alloy MM-509 cast superalloys were coated in accordance with the present invention. These test bars were coated in the manner described in U.S. Pat. No. 4,055,705.

All the coatings were manually plasma sprayed in air with a target thickness of 0.038 cm for the thermal barrier layer and 0.010 cm for the bond coatings. The actual thicknesses of these hand-sprayed coatings were measured from metallographic cross sections. On any single hollow erosion bar, coating thicknesses locally varied from 0.030 to 0.050 cm for the thermal barrier coatings and from 0.005 to 0.020 cm for the bondcoatings.

The effects of sodium and vanadium contaminated combustion gases on the coated test bars were studied. Combustion dopant levels of NaOH for Na and $NH_4VO_3$ for V were based on the amount of Jet A fuel consumed. The dopant levels were set at fuel equivalents of 0.5 ppm Na, 5 ppm Na, 0.2 ppm V, 2 ppm V, and 5 ppm Na+2 ppm V. These levels were chosen because they encompassed the maximum ASTM fuel specifications for specifying number 2 gas turbine fuel.

During each test air, fuel, and gaseous solutions of NaOH and $NH_4VO_3$ were injected into a combustor, ignited, and expanded through a convergent-divergent nozzle with exit velocities of Mach 0.3. The fuel-to-air mass ratio for all testing in fuel impurity sensitivity studies was 0.040. This fuel-to-air mass ratio corresponds to a calculated adiabatic flame temperature of 1370° C.

Prior to any Mach 0.3 burner rig testing, the amount of cooling air required to maintain the metal substrate at 843° C. was determined from measurements taken on $ZrO_2$-$12Y_2O_3$/NiCrAlY coated hollow erosion bars with thermocouples embedded in the leading edges.

The coated test bars were exposed to thermal cycles consisting of one hour at temperature followed by four minutes out of the flame with the internal cooling air on. All specimens in these tests were examined daily for the first six one-hour cycles and at the end of the twentieth cycle. Testing was stopped when the coating had spalled over approximately one-fourth of the hot zone in the leading edge.

In this test spalling occurred on the standard thermal barrier coating after 43 one-hour cycles when the equivalent fuel impurity concentration was 5 ppm Na+2 ppm V. When the thermal barrier coated specimens were tested at fuel impurity levels of 5 ppm Na only or with 2 ppm V only, the coated specimens spalled at 92 and 25 one-hour cycles, respectively.

A number of thermal barrier coatings embodying the features of the present invention were tested in a similar manner and compared with the coatings of U.S. Pat. No. 4,055,705. These tests were conducted with the equivalent fuel impurity level of 2 ppm V plus 5 ppm Na. The testing procedure was similar to that above with the exception that eight specimens were tested simultaneously. As with the previous tests a special cooling insert was fitted into each thermal barrier coated hollow erosion bar to provide impingement cooling on the wedge leading edge. Test parameters for the 1000 hour Mach 0.3 burner rig test were: fuel/air mass of 0.040, 1370° C. calculated adiabatic flame temperature, holder rotation of 450 rpm, specimen distance 2.5 cm from the exit nozzle, and the measured substrate temperature of 843° C.

The coated specimens were examined at intervals of 20 one-hour cycles. Any particular coated specimen was removed from testing when the coating had spalled over approximately one-fourth the hot zone on the leading edge. The number of 1-hour cycles to spall is set forth in the last column in the Table for each coating system. This represents the total number of cycles that the coating system had undergone at the end of the inspection interval.

Metallographic examination of sections taken from the hot zone and from a cool region near the base were used to determine the extent of hot corrosion and the mode of spalling. X-ray defraction analysis was performed on small samples of coating taken from locations near cross-section cuts of the single fuel impurity sensitivity specimens.

On the coatings shown in the Table, the one based on $1.8Ca.SiO_2$ reached 675 1-hour cycles before spalling. Also, a cermet coating of 50 volume percent MgO-50 volume percent Ni-20 w/o Cr-17 w/o Al-1.0 w/o Y survived 1000 one-hour cycles without spalling. These two coatings proved to have significantly better high corrosion resistance than the four standard thermal barrier coatings which all spalled by 80 cycles.

The metal substrate temperature measured during the same calibration run for both $1.8CaO.SiO_2$ and $ZrO_2$-$12Y_2O_3$ coated bars was 843° C. which indicates that the $1.8CaO.SiO_2$ and the $ZrO_2$-$12Y_2O_3$ coatings are equivalent in thermal insulating ability.

While the preferred mode for carrying out the invention has been described, it will be appreciated that various alternative modes may be utilized without departing from the spirit of the invention or the scope of the subjoined claims. By way of example, it is contemplated that the coating could be graded either continuously or in several discrete steps from 100% bond coat at the substrate surface to 100% oxide at the outer surface and the total coating thickness would be 10 to 50 mils. Such a coating could be applied by plasma spraying. In still another embodiment the thermal barrier layer of alkaline earth silicates may be deposited by physical vapor deposition or by sputtering.

in the range of $1.8CaO:1SiO_2$ to $3CaO:1SiO_2$, magnesium silicate in the range of $1.8MgO:1SiO_2$ and $3MgO:1SiO_2$, and calcium silicate in the range of $1.8CaO:1SiO_2$ and $3CaO:1SiO_2$ covering said bond coating.

2. A thermal barrier coating system as claimed in claim 1 wherein the substrate is a metal selected from the group consisting of nickel-base and cobalt-base superalloys.

3. A thermal barrier coating system as claimed in claim 1 wherein the bond coating is an alloy which contains at least one metal selected from the group consisting of chromium and aluminum.

4. A thermal barrier coating system as claimed in claim 3 wherein the bond coating is an alloy selected from group consisting of NiCrAlY, CoCrAlY, and NiCoCrAlY.

5. A thermal barrier coating system as claimed in claim 4 wherein the bond coating has a thickness of between about 0.005 centimeters and about 0.025 centimeters.

6. A thermal barrier coating system as claimed in claim 1 wherein the oxide thermal barrier coating has a thickness between about 0.012 centimeters and 0.120 centimeters.

7. A thermal barrier coating system as claimed in claim 6 wherein the oxide has a thickness of about 0.038 centimeters.

8. A thermal barrier coating system as claimed in claim 1 wherein the corrosion-resistant oxide is calcium silicate in the range of $1CaO:1SiO_2$ to $3CaO:1SiO_2$.

9. A thermal barrier coating system as claimed in claim 1 wherein the corrosion-resistant oxide is magnesium silicate in the range between $1MgO:1SiO_2$ and $3MgO:1SiO_2$.

10. A thermal barrier coating system as claimed in claim 1 wherein the corrosion-resistant oxide is barium silicate in the range between $1BaO:1SiO_2$ and $3BaO:1SiO_2$.

11. A thermal barrier coating system for protecting the surface of a metal substrate in a hot corrosive gas comprising
a metal alloy bond coating containing a metal selected from the group consisting of nickel, cobalt, and iron covering said surface of said substrate, and
a corrosion resistant oxide thermal barrier coating containing a combination of barium, magnesium, and calcium silicates covering said bond coating.

12. A thermal barrier coating system as claimed in claim 1 wherein the corrosion-resistant oxide thermal barrier coating contains up to 50% by weight of free silica.

COATING COMPOSITIONS OF THERMAL BARRIERS AND BOND COATING

| Thermal Barrier | Bond Coating | Number of One-hour Cycles To Spall Coating From ca. ¼ of the Hot Zone |
|---|---|---|
| $ZrO_2$-12 w/o $Y_2O_3$ | Ni-16 w/o Cr-5 w/o Al-0.6 w/o Y | 80 |
| $ZrO_2$-18 w/o $Y_2O_3$ | " | 100 |
| $ZrO_2$-8 w/o $Y_2O_3$ | Ni-16 w/o Cr-5 w/o Al-0.15 w/o Y | 384 |
| $ZrO_2$-4 w/o $Y_2O_3$ | " | 145 |
| $ZrO_2$-12 w/o $Y_2O_3$ | Ni-31 w/o Cr-12 w/o Al-0.6 w/o Y | 178 |
| 1.8 CaO . Si $O_2$ | Ni-16 w/o Cr-6 w/o Al-0.6 w/o Y | 675 |
| 50 Vol % MgO-50 Vol % Ni-20 w/o Cr-17 w/o Al-1.0 w/o Y | " | 1000 |

We claim:

1. A thermal barrier coating system for protecting the surface of a metal substrate in a hot corrosive gas comprising
a metal alloy bond coating containing a metal selected from the group consisting of nickel, cobalt, and iron covering said surface of said substrate, and
a corrosion-resistant oxide thermal barrier coating containing at least one alkaline earth silicate selected from the group consisting of calcium silicate

* * * * *